United States Patent
Jagadeesan et al.

(10) Patent No.: US 7,440,430 B1
(45) Date of Patent: Oct. 21, 2008

(54) JITTER BUFFER MANAGEMENT FOR MOBILE COMMUNICATION HANDOFFS

(75) Inventors: Ramanathan T. Jagadeesan, San Jose, CA (US); Andrew C. Chung, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 963 days.

(21) Appl. No.: 10/812,604

(22) Filed: Mar. 30, 2004

(51) Int. Cl.
*H04Q 7/00* (2006.01)

(52) U.S. Cl. ................................ 370/331
(58) Field of Classification Search ........... 370/310, 370/312, 314, 328, 332, 333, 337, 347, 331; 455/403, 405, 422, 436–442
See application file for complete search history.

(56) References Cited

U.S. PATENT DOCUMENTS

| | | | | |
|---|---|---|---|---|
| 5,822,313 A * | 10/1998 | Malek et al. | ............... | 370/332 |
| 6,259,677 B1 | 7/2001 | Jain | ............................ | 370/252 |
| 6,301,258 B1 * | 10/2001 | Katseff et al. | ................ | 370/412 |
| 6,418,125 B1 | 7/2002 | Oran | ............................ | 370/266 |
| 6,424,638 B1 * | 7/2002 | Ray et al. | .................... | 370/331 |
| 6,452,950 B1 * | 9/2002 | Ohlsson et al. | .............. | 370/516 |
| 6,658,027 B1 | 12/2003 | Kramer et al. | ............... | 370/516 |
| 6,683,889 B1 * | 1/2004 | Shaffer et al. | ................ | 370/516 |
| 6,684,273 B2 * | 1/2004 | Boulandet et al. | ............. | 710/52 |
| 6,757,292 B2 * | 6/2004 | Pate et al. | ..................... | 370/412 |
| 7,016,970 B2 * | 3/2006 | Harumoto et al. | ............ | 709/233 |
| 7,277,943 B1 * | 10/2007 | Surazski | ...................... | 709/226 |
| 7,313,628 B2 * | 12/2007 | Chaskar et al. | ............. | 709/238 |
| 2004/0071088 A1 * | 4/2004 | Curcio et al. | ................ | 370/235 |

OTHER PUBLICATIONS

Benaissa, An algorithm for playout delay adjustment for interactive audio applications in mobile ad hoc networks, Proceedings of ISCC'02, IEEE, 2002, pp. 1-6.*

* cited by examiner

*Primary Examiner*—Dmitry Levitan
(74) *Attorney, Agent, or Firm*—Baker Botts L.L.P.

(57) ABSTRACT

A method of providing communication service includes determining a first playback delay based on one or more network characteristics of a first network and one or more network characteristics of a second network. The method also includes storing media received from the first network in a first buffer and playing media received from the first network after the media received from the first network has been stored in the first buffer an amount of time based on the first playback delay. The method further includes detecting a handoff trigger and storing media received from the second network in a second buffer, in response to detecting the handoff trigger. The method also includes playing media received from the second network.

71 Claims, 3 Drawing Sheets

JITTER BUFFER MANAGEMENT FOR MOBILE COMMUNICATION HANDOFFS

TECHNICAL FIELD OF THE INVENTION

This invention relates in general to telecommunications, and more particularly to jitter buffer management within communication devices.

BACKGROUND OF THE INVENTION

A user of a communication device, such as a mobile phone, may find it necessary during use to transition between two or more networks as the user moves. To avoid disrupting communication, the communication device may transition to a new network before the mobile phone loses connectivity over the original network. However, differences between the two networks may make it difficult to avoid disrupting communication.

SUMMARY OF THE INVENTION

In accordance with the present invention, disadvantages and problems associated with jitter buffer management have been substantially reduced or eliminated. In particular, a method and system are disclosed for managing jitter buffers to provide seamless handoffs between multiple communication networks.

In accordance with one embodiment of the present invention, a method of providing communication service includes determining a first playback delay based on one or more network characteristics of a first network and one or more network characteristics of a second network. The method also includes storing media received from the first network in a first buffer and playing media received from the first network after the media received from the first network has been stored in the first buffer an amount of time based on the first playback delay. The method further includes detecting a handoff trigger and storing media received from the second network in a second buffer, in response to detecting the handoff trigger. The method additionally includes playing media received from the second network.

In accordance with another embodiment of the present invention, a method of providing communication service includes determining a first minimum delay based on one or more network characteristics of a first network and one or more network characteristics of a second network and determining a first current delay for a first buffer. The first current delay is greater than or equal to a first minimum delay. The method further includes storing media received from the first network in the first buffer and playing media received from the first network after the media received from the first network has been stored in the first buffer an amount of time based on at least the first current delay. The method also includes detecting a handoff trigger and storing media received from the second network in a second buffer, in response to detecting the handoff trigger. The method additionally includes playing media received from the second network.

Technical advantages of certain embodiments of the present invention include providing buffer management techniques that adapt to characteristics of both networks involved in a handoff to allow for seamless switchover between media received from the two networks. Other technical advantages of certain embodiments of the present invention include the ability to balance playback delay and packet loss.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
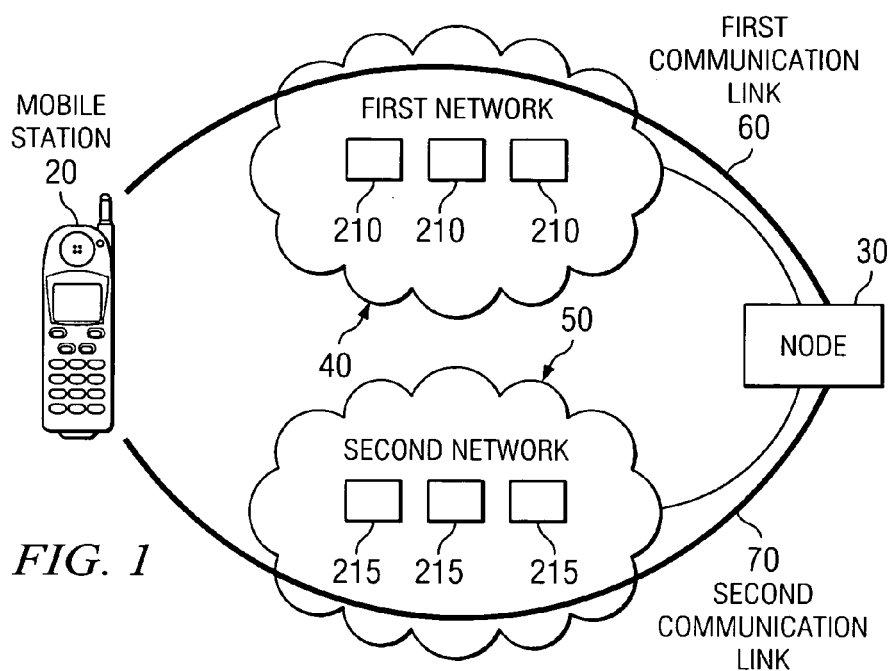
FIG. 1 illustrates a communication system according to a particular embodiment of the present invention.

FIG. 1 illustrates a communication system 10 that provides communication service to a mobile station 20. Communication system 10 includes mobile station 20, a node 30, a first network 40, and a second network 50. Communication system 10 supports communication between mobile station 20 and node 30 using a first communication link 60 established over first network 40 or a second communication link 70 established over second network 50. Mobile station 20 buffers media received from first communication link 60 and second communication link 70 in jitter buffers. To avoid disruption of communication during handoff, mobile station 20 utilizes jitter buffer management techniques that allow mobile station 20 to satisfy de-jittering requirements of the individual networks and to ensure that appropriate media is available after switchover despite potential differences between the two networks. More specifically, mobile station 20 achieves a seamless switchover between communication over first network 40 and communication over second network 50 by setting and/or adjusting playback delay parameters for the jitter buffers based on characteristics of both first network 40 and second network 50.

Mobile station 20 provides wireless communication services to a user of mobile station 20. Mobile station 20 may provide the user voice, video, and/or data communication. Mobile station 20 is capable of transmitting and receiving media according to one or more protocols associated with first network 40 and one or more protocols associated with second network 50. Additionally, mobile station 20 may be operable to receive and transmit media in any appropriate format. Although the following description describes mobile station 20 as receiving and transmitting media in the form of "packets", the media received and transmitted by mobile station 20 may represent packets, frames, cells, a continuous or intermittent media stream, and/or media structured in any other appropriate manner. Furthermore, mobile station 20 may receive different forms of media from first network 40 and second network 50. In a particular embodiment, mobile station 20 receives mobile-IP packets from first network 40 and a continuous stream of media segmented into frames from second network 50. Examples of mobile station 20 include mobile phones, personal digital assistants ("PDAs"), laptop computers, and any other portable communication device suitable for use with communication system 10.

First network 40 and second network 50 represent any form of communication networks supporting circuit-switched, packet-based, and/or any other suitable type of communication. Moreover, first network 40 and second network 50 may each represent one or more separate networks. First network 40 and second network 50 may each include routers, hubs, switches, gateways, call controllers, or any other suitable components in any suitable form or arrangement. In general, first network 40 and second network 50 may each comprise any combination of public or private communication equipment such as elements of PSTN, a global computer network such as the internet, a local area network (LAN), a wide-area network (WAN), or other appropriate communication equipment.

Additionally, network characteristics associated with first network 40 and second network 50 may affect communication transmitted over these networks. As one example, each path between mobile station 20 and node 30, within a particular network, may have a fixed delay that represents an amount of time communication traffic will take to travel that path absent the presence of other traffic and any congestion-related delays on the path. The fixed delay may vary for different paths of the network. Thus, each network may possess a minimum network delay that is associated with the shortest path between mobile station 20 and node 30, and a maximum network delay associated with the longest path. Furthermore, both the minimum network delay and the maximum network delay may represent individual values or ranges of values. In general, differences in network delay between the two networks may create difficulties for mobile station 20 in synchronizing packets received over first network 40 with those received over second network 50 during a handoff.

As another example, first network 40 and second network 50 may each have a network jitter that adds a variable amount of additional delay to the transmission of packets on the two networks and that may also cause packets transmitted over the network to arrive out of order at mobile station 20. Network jitter may be the result of traffic on the relevant network or other factors that create delay in addition to the fixed delay of the network. In a particular embodiment, as discussed in greater detail below, mobile station 20 uses jitter buffers to compensate for both fixed delay and network jitter of first network 40 and second network 50, so that mobile station 20 may perform a seamless switchover between communication on first network 40 and communication on second network 50.

Node 30 communicates with mobile station 20 over first network 40 and/or second network 50 using a first communication link 60 and/or a second communication link 70, respectively. Node 30 may represent a node located within a communication network, a node connecting neighboring communication networks, or a terminal unit of a communication network. In a particular embodiment, node 30 represents a handoff server capable of facilitating communication between mobile station 20 and a remote element over first network 40, and also of transferring communication between mobile station 20 and the remote element to second network 50, in response to a handoff trigger.

In operation, mobile station 20 initiates a communication session through node 30 over first network 40. Mobile station 20 may initiate the communication session in any manner appropriate to establish a communication path by which mobile station 20 can transmit media to node 30 or to a remote element through node 30. As part of initiating the communication session, mobile station 20 may establish a first communication link 60 with node 30 over which mobile station 20 and node 30 may communicate media. For example, mobile station 20 may establish a circuit-switched communication link between mobile station 20 and node 30 on first network 40 and initiate a cellular call over the circuit-switched communication link. As another example, mobile station 20 may initiate the communication session by establishing a mobile-IP tunnel over first network 40 and/or perform call setup for a VoIP communication session over the mobile-IP tunnel. The communication session may represent a telephone call, a chat session, a video stream, a facsimile transmission, or any other appropriate form of communication.

As part of the communication session, mobile station 20 may communicate media with node 30, using any communication protocol appropriate for first network 40. For example, if first network 40 represents a circuit-switched network, mobile station 20 may communicate information using conventional cellular techniques. As another example, if first network 40 represents a packet-based network, mobile station 20 may communicate information using conventional mobile-IP and VoIP techniques. For the purposes of illustration, FIG. 1 shows mobile station 20 and node 30 communicating over first communication link 60 in the form of first network packets 210. After receiving first network packets 210 from node 30, mobile station 20 may play, display, or otherwise present first network packets 210 received over first communication link 60 to a user of mobile station 20. In a particular embodiment, mobile station 20 establishes a cellular voice call between mobile station 20 and node 30, and mobile station 20 plays audio signals received in first network packets 210 from node 30.

During communication, mobile station 20 or first network 40 may detect a handoff trigger. The handoff trigger may represent any suitable event indicating to the detecting component that a handoff between first network 40 and second network 50 is appropriate. For example, handoff trigger may represent a determination by mobile station 20 or first network 40 that a signal strength associated with first network 40 or mobile station 20, respectively, is below a predetermined threshold, a determination by mobile station 20 that a signal strength associated with second network 50 is greater than the signal strength associated with first network 40, receipt of an input from a user indicating a desire to switch networks, or any other appropriate event detected by mobile station 20 or first network 40.

As a result of the handoff trigger, mobile station 20 may execute a handoff to transfer communication from first network 40 to second network 50. To initiate the handoff, mobile station 20 may signal to node 30 a desire to initiate a handoff, contact a component of second network 50, and/or take any other appropriate steps to execute the handoff. During the handoff, mobile station 20 may initiate a second communication link 70 between mobile station 20 and node 30 over second network 50.

Second communication link 70 may represent one or more segments in a communication path coupling mobile station 20 and node 30 over second network 50. As discussed above with respect to first communication link 60, mobile station 20 may establish second communication link 70 in any manner appropriate to establish a communication path by which mobile station 20 can transmit information associated with the communication session to node 30. As one example, mobile station 20 may establish second communication link 70 by establishing a circuit-switched connection between mobile station 20 and node 30 on second network 50. As another example, mobile station 20 may establish second communication link 70 by establishing a mobile-IP tunnel and/or performing other appropriate IP signaling with node 30 over second network 50. After establishing second communication link 70, mobile station 20 begins to receive packets associated with the communication session over second network 50, shown in FIG. 1 as second network packets 215.

After establishing second communication link 70, mobile station 20 may also synchronize media received over second communication link 70 with media received over first communication link 60 to provide a seamless handoff between communication on first network 40 and second network 50 so that the handoff is transparent to the user. More specifically, mobile station 20 may identify a second network packet 215 associated with the same point in the communication session as the first network packet 210 currently being played by mobile station 20. For example, based on a comparison of sequence numbers or time stamps, a cross-correlation of media samples, or a consideration of any other appropriate characteristics of first network packets 210 and second network packets 215, mobile station 20 may determine a second network packet 215 generated at or near the same time as the first network packet 210 currently being played to the user. In a particular embodiment, first network 40 represents a packet-based network and first network packets 210 represent mobile-IP packets, while second network 50 represents a circuit-switched cellular network and second network packet 215 represents frames of a continuous media stream. In this embodiment, mobile station 20 may synchronize the mobile-EP packets and the media stream by performing a cross-correlation of the voice signals included in the mobile-IP packets and the media stream. Mobile station 20 may, as a result, determine a frame in the media stream that corresponds to the mobile-EP packets currently being played by mobile station 20.

Additionally, first network 40 and second network 50 may possess one or more characteristics that affect communication over first communication link 60 and second communication link 70, and thus, may impact synchronization of first communication link 60 and second communication link 70. For example, network delay on first network 40 or second network 50 may cause communication received by mobile station 20 over first communication link 60 or second communication link 70, respectively, to lag behind communication received over the other link. As another example, network jitter on first network 40 or second network 50 may cause information transmitted to mobile station 20 over first communication link 60 and second communication link 70, respectively, to arrive at mobile station 20 out of order. Thus, the corresponding second network packet 215 may arrive prior to, at the same time, or after the first network packet 210 being played by mobile station 20 at the time of switchover. To seamlessly continue playing media from the communication session, mobile station 20 utilizes jitter buffers configured based on network characteristics of first network 40 and/or second network 50 to compensate for the effects of network delay and jitter, as described in greater detail with respect to FIG. 2.

Figure 2:
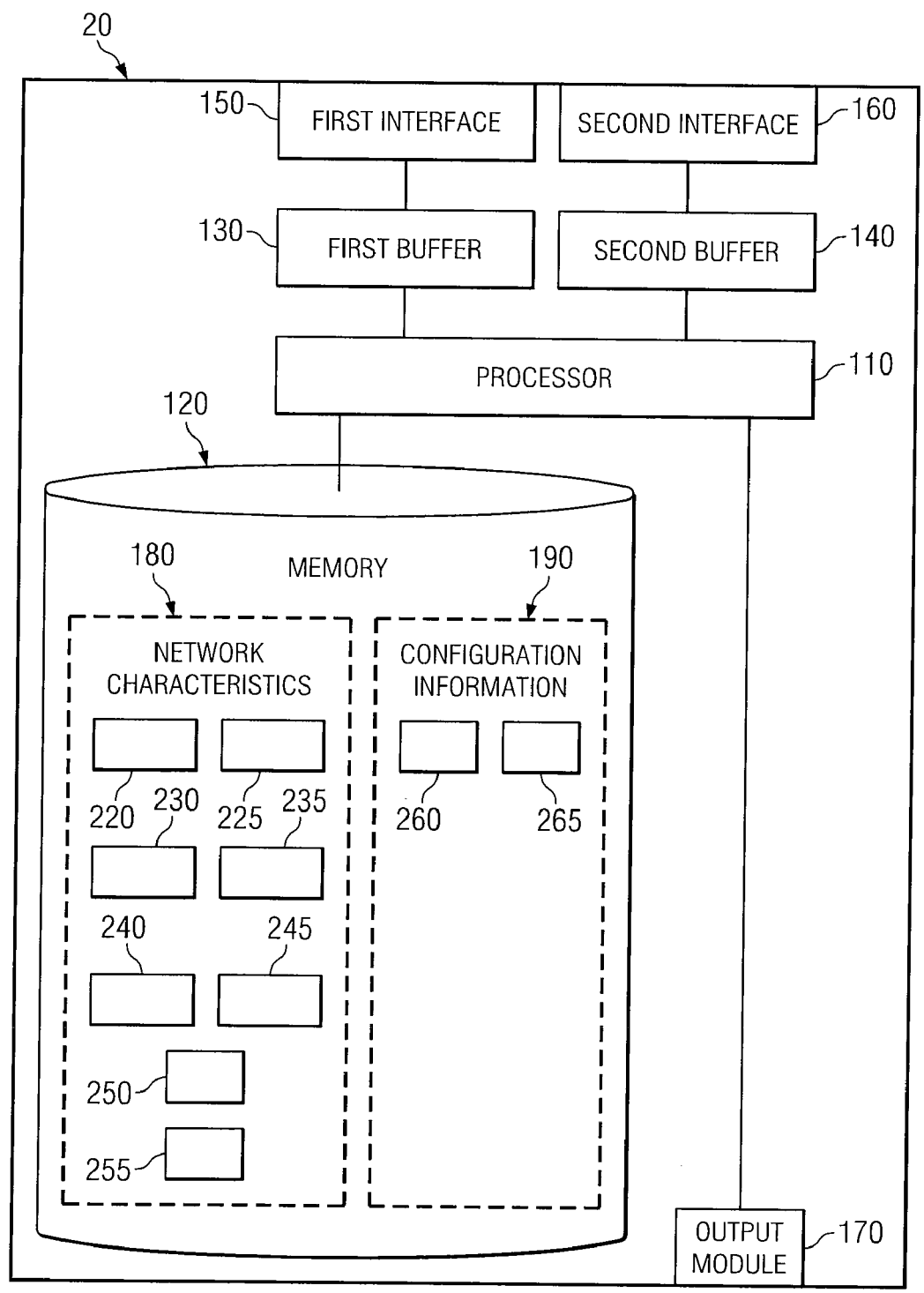
FIG. 2 is a block diagram illustrating contents of a mobile communication device according to a particular embodiment.

FIG. 2 illustrates in greater detail the contents of mobile station 20. In a particular embodiment, mobile station 20 includes a processor 110, a first buffer 130, a second buffer 140, a first interface 150, a second interface 160, and an output module 170. First buffer 130 and second buffer 140 store media received on first interface 150 and second interface 160 before the media is provided to output module 170 to be output to a user.

Processor 110 executes instructions associated with the configuration and operation of first interface 150, second interface 160, first buffer 130, and second buffer 140, and other appropriate components of mobile station 20. Processor 110 may access memory 120 to retrieve and execute stored instructions. Processor 110 may be a general-purpose computer, dedicated microprocessor, or other device capable of processing electronic information, including any appropriate controlling logic. Examples of processor 110 include application-specific integrated circuits (ASICs), field-programmable gate arrays (FPGAs), digital signal processors (DSPs) and any other suitable specific- or general-purpose processors.

First interface 150 and second interface 160 facilitate communication between mobile station 20 and first network 40 and/or second network 50. In a particular embodiment, first interface 150 and second interface 160 may each be capable of communicating according to one or more communication protocols supported by mobile station 20. First interface 150 and second interface 160 may be configured to communicate using a common set of communication protocols, or first interface 150 and second interface 160 may each support a different set of communication protocols. First interface 150 and second interface 160 may include any appropriate combination of hardware and/or software suitable for providing the functionality described below. Additionally, first interface 150 and second interface 160 may represent logically distinct components or may represent, in part or in whole, common components.

In the illustrated embodiment, it is assumed that mobile station 20 communicates with first network 40 using first interface 150 and with second network 50 using second interface 160. In a particular embodiment, however, first interface 150 and second interface 160 may both be capable of communicating with either of first network 40 and second network 50. For example, mobile station 20 may be configured to initiate communication initially with an appropriate network using first interface 150. In such an embodiment, mobile station 20 may initiate communication using second interface 160 once mobile station 20 is already communicating over first interface 150. In general, mobile station 20 may be configured to communicate with first network 40 and second network 50 using first interface 150 and second interface 160 in any suitable manner.

First buffer 130 and second buffer 140 store data received by first interface 150 and second interface 160, respectively. A playback delay is associated with each of first buffer 130 and second buffer 140. The playback delay specifies how long that buffer holds packets before the packets are played by mobile station 20 or otherwise removed from the buffer. First buffer 130 and second buffer 140 may represent portions of memory 120, distinctly separate memory elements, or any other components suitable for storing data received by mobile station 20. First buffer 130 and second buffer 140 may also represent portions of a single buffer. Additionally, first buffer 130 and second buffer 140 may represent static buffers having a fixed playback delay, or dynamic buffers having a variable playback delay. Although FIG. 2 shows a mobile station 20 that includes first buffer 130 and second buffer 140, mobile station 20 may be configured to include any suitable number of buffers.

Output module 170 plays, displays, or otherwise presents media received by mobile station 20 to the user. Output module 170 may include speakers, displays, monitors, and/or any other suitable components, including software and/or hardware, for presenting media to the user. Output module 170 may also include any appropriate combination of hardware or software for formatting the media prior to presentation, such as digital signal processors (DSPs), digital-to-analog converters, and/or other suitable formatting components.

Memory 120 may store instructions, network characteristics 180, configuration information 190, information identifying mobile station 20, such as a Mobile Identification Number (MIN), and/or any other suitable information used by mobile station 20 during configuration or operation. Additionally, memory 120 may include portions or the entirety of first buffer 130 and/or second buffer 140. In general, memory 120 may comprise any collection and arrangement of volatile or non-volatile, local or remote devices suitable for storing data, such as random access memory (RAM) devices, read only memory (ROM) devices, magnetic storage devices, optical storage devices, or any other suitable data storage devices.

Network characteristics 180 represent information describing characteristics of first network 40 and second network 50 that mobile station 20 may use during operation. In particular embodiments, network characteristics 180 include jitter values and network delay values for first network 40 and second network 50, as discussed below. Network characteristics 180 may be pre-programmed into mobile station 20, transmitted to mobile station 20 during operation by a network monitor, calculated independently by mobile station 20, or obtained by mobile station 20 in any other appropriate manner. Furthermore, network characteristics 180 may represent nominal, worst-case, or any other measure of the relevant characteristics for this particular network, a related network, networks of the same type, or any other network or networks. In general, network characteristics 180 may include any suitable information pertaining to the composition, operation, performance and/or any other aspect of first network 40 or second network 50.

Configuration information 190 represents information defining a configuration for mobile station 20 or individual components of mobile station 20. In a particular embodiment, configuration information 190 may include buffer sizes and/or playback delays for first buffer 130 and second buffer 140. In general, configuration information may include any parameters, settings, or other information that control characteristics or operation of mobile station 20, and/or individual components of mobile station 20 during operation. Additionally, elements of configuration information 190 may be pre-programmed into mobile station 20, set by mobile station 20 during power-up, determined by mobile station 20 whenever mobile station 20 initiates a communication session, and/or stored at any other appropriate time. Although the description below assumes mobile station 20 sets configuration information 190 and otherwise configure mobile station 20, any portion of configuration information 190 may be set by mobile station 20, or programmed by a user, manufacturer, service provider, or any other party or component.

In operation, mobile station 20 configures first buffer 130 and second buffer 140 based on network characteristics 180 associated with first network 40 and second network 50. Mobile station 20 may configure first buffer 130 and second buffer 140 before initiating communication, or at any other appropriate time. Configuring first buffer 130 and second buffer 140 may include determining a first playback delay of first buffer 130 and a second playback delay of second buffer 140 based on network characteristics 180. Mobile station 20 may determine the first playback delay and the second playback delay by calculating values for first playback delay and second playback delay, accessing memories to retrieve first playback delay and second playback delay, or determine the first playback delay and second playback delay in any other suitable manner.

In the illustrated embodiment, network characteristics 180 include a first maximum jitter 220 and a second maximum jitter 225. First maximum jitter 220 and second maximum jitter 225 represent the greatest amount of jitter experienced by the relevant network over a particular period of time, a typical highest jitter experienced by networks of the same type as the relevant network, or any other suitable measure of actual, typical, or expected maximum jitter level or any other suitable value based on actual, typical, or expected maximum jitter levels. As one example, first maximum jitter 220 and second maximum jitter 225 may represent a value that is a predetermined level below the greatest measured jitter of the network. As another example, first maximum jitter 220 and second maximum jitter 225 may be determined based on a value representing a particular percentile, such as the ninetieth-fifth percentile, of measured jitter values for the relevant network over a given time period or for networks similar to the relevant network.

Additionally, in this embodiment, network characteristics 180 include first maximum delay 230 and second maximum delay 235, which may represent the time a packet would take to travel a longest path between node 30 and mobile station 20 on first network 40 and second network 50, respectively, absent other traffic on the path. First maximum delay 230 and second maximum delay 235 may represent any suitable measure of an actual, typical, or expected maximum delay or any other suitable value based on actual, typical, or expected maximum delays. As one example, first maximum delay 230 and second maximum delay 235 may represent a value based on the ninety-fifth percentile of measured delays for the relevant network over a given time period or for networks similar to the relevant network.

Network characteristics 180, as illustrated, also include first minimum delay 240 and second minimum delay 245, which may represent the time a packet takes to travel a shortest path between node 30 and mobile station 20 on first network 40 and second network 50, respectively, absent other traffic on the path. First minimum delay 240 and second minimum delay 245 may represent any suitable measure of an actual, typical, or expected minimum delay or any other suitable value based on actual, typical, or expected minimum delays. As one example, first minimum delay 240 and second minimum delay 245 may represent a value based on the fifth percentile of delays for the relevant network over a given time period or for networks similar to the relevant network. Network characteristics 180 may also include one or more values derived from other network characteristics 180. These values may be calculated by mobile station 20 or provided to mobile station 20 by a user or another device. For example, assuming for the purposes of illustration that second minimum delay 245 is greater than first maximum delay 230, mobile station 20 may calculate a maximum delay difference 250 which represents the difference between second maximum delay 235 and first minimum delay 240. Mobile station 20 may also calculate a minimum delay difference 255 which represents the difference between second minimum delay 245 and first maximum delay 230. Network characteristics 180, in a particular embodiment, may include both maximum delay difference 250 and minimum delay difference 255.

Depending on the configuration and characteristics of mobile station 20, mobile station 20 may then use network characteristics 180 in any suitable manner to determine a playback delay for first buffer 130, a first playback delay, and a playback delay for second buffer 140, a second playback delay. In a particular embodiment, mobile station 20 may determine the first playback delay based on the greater of first maximum jitter 220 and the sum of second maximum jitter 225 and maximum delay difference 250. In this embodiment, mobile station 20 may also determine the second playback delay based on the greater of second maximum jitter 225 and the difference between first maximum jitter 220 and minimum delay difference 255. More specifically, mobile station 20 may determine the first playback delay and the second playback delay according to the following formulas:

first playback delay=MAX(first maximum jitter, second maximum jitter+maximum delay difference)

second playback delay=MAX(second maximum jitter, first maximum jitter−minimum delay difference)

By determining first playback delay based on first maximum jitter 220, mobile station 20 may be able to ensure that playback of first network packets 210 will not be disrupted by jitter on first network 40. Furthermore, by also determining the first playback delay based on second maximum jitter 225 adjusted by the difference between the network delays of the two networks, mobile station 20 may cause playback of a particular first network packet 210 to be delayed until second buffer 140 has received the corresponding second network packet 215. This may ensure that the appropriate second network packet 215 will always be available for mobile station 20 to execute a seamless switchover from first network packets 210 to second network packets 215.

After determining the first playback delay and the second playback delay, mobile station 20 may configure first buffer 130 and second buffer 140 using these values. In the illustrated embodiment, mobile station 20 configures first buffer 130 and second buffer 140 by storing the first playback delay and the second playback delay in configuration information 190 as first playback delay 260 and second playback delay 265, respectively. In such an embodiment, processor 110, output module 170, first buffer 130, and/or second buffer 140 may later reference first playback delay 260 and second playback delay 265, or other elements of configuration information 190 to determine an appropriate amount of time to store packets received by mobile station 20.

Alternatively, as suggested above, mobile station 20 may be configured by a user or other party, or by another device or devices, prior to operation of mobile station 20. As one example, configuration information 190 may be programmed into a read-only memory (ROM) of mobile station 20 by a manufacturer, using typical values for network characteristics 180 and configuration information 190. As another example, configuration information 190 may be programmed into a re-programmable random access memory (RAM) of mobile station 20 by a service provider using network characteristics 180 of a home network associated with mobile station 20. In general, mobile station 20 may be configured by any appropriate party or device in any appropriate manner, including, as described above, auto-configured before operation by mobile station 20.

After configuring first buffer 130 and second buffer 140, mobile station 20 initiates communication with node 30 over first network 40 using first interface 150. While communicating over first network 40, mobile station 20 receives first network packets 210 from node 30 through first interface 150. Mobile station 20 stores each first network packet 210 in first buffer 130 for a period of time based on first playback delay 260 and then plays first network packets 210 using output module 170.

For the purposes of this description, first network packets 210 may be stored in first buffer 130 an amount of time that is based in any suitable manner on first playback delay 260. For example, in a particular embodiment, first playback delay 260 may represent a maximum amount of time first network packets 210 are stored in first buffer 130. Thus, if a particular first network packet 210 arrives at mobile station 20 out of order, that first network packet 210 may be moved ahead of other first network packets 210 in first buffer 130 to correct the ordering and, as a result, may be stored in first buffer 130 less than the maximum amount of time.

If mobile station 20 detects a handoff trigger, for example as a result of moving into an area associated with second network 50, mobile station 20 may begin communicating with node 30 over second network 50 using second interface 160. As a result, mobile station 20 may begin to receive second network packets 215 from node 30. Mobile station 20 stores each second network packet 215 in second buffer 140 for a period of time based on second playback delay 265 and then discards or otherwise disposes of that particular second network packet 215.

For the purposes of this description, second network packets 215 may be stored in second buffer 140 an amount of time that is based in any suitable manner on second playback delay 265. For example, in a particular embodiment, second playback delay 265 may represent a maximum amount of time second network packets 215 are stored in second buffer 140. Thus, if a particular second network packet 215 arrives at mobile station 20 out of order, that second network packet 215 may be moved ahead of other second network packets 215 in second buffer 140 to correct the ordering and, as a result, may be stored in second buffer 140 less than the maximum amount of time.

Mobile station 20 may then execute a switchover between communication on first network 40 and communication on second network 50. As part of the switchover, mobile station 20 may synchronize first network packets 210 and second network packets 215 to identify a second network packet 215 stored in second buffer 140 that corresponds to the first network packet 210 current being played, as described above. Mobile station 20 may then proceed with the handoff and begin playing second network packets 215 starting with the identified second network packet 215 or with second network packets 215 that follow the identified second network packet 215. Because mobile station 20 determines first playback delay 260 based on the network characteristics of both first network 40 and second network 50, mobile station 20 may ensure that, at any point during the communication session, second buffer 140 has received the second network packet 215 corresponding to the currently playing first network packet 210. Additionally, this configuration may ensure that mobile station 20 meets jitter requirements of second network 50 after switchover.

Subsequent to this handoff, mobile station 20 or second network 50 may detect a second handoff trigger indicating to the detecting component that a handoff between second network 50 and first network 40 is appropriate. As a result, mobile station 20 may synchronize second network packets 215 and first network packets 210 to identify a first network packet 210 that corresponds to the second network packet 215 mobile station 20 is currently playing. Because mobile station 20 determines second playback delay 265 based on the network characteristics of both first network 40 and second network 50, mobile station 20 may ensure that, at any point during the communication session, first buffer 130 has received the first network packet 210 corresponding to the currently playing second network packet 215.

Thus, by setting first playback delay 260 and second playback delay 265 based on the above formulas, mobile station 20 may be able to provide seamless handoff between first network 40 and second network 50, despite jitter and network delay associated with first network 40 and second network 50. More specifically, by determining the playback delay for each buffer based on the jitter values of the two networks and on the difference in network delays between the two networks, a particular embodiment of mobile station 20 may be able to ensure that following switchover the new buffer will contain a packet that corresponds to the packet being played from the current buffer.

Figure 3:
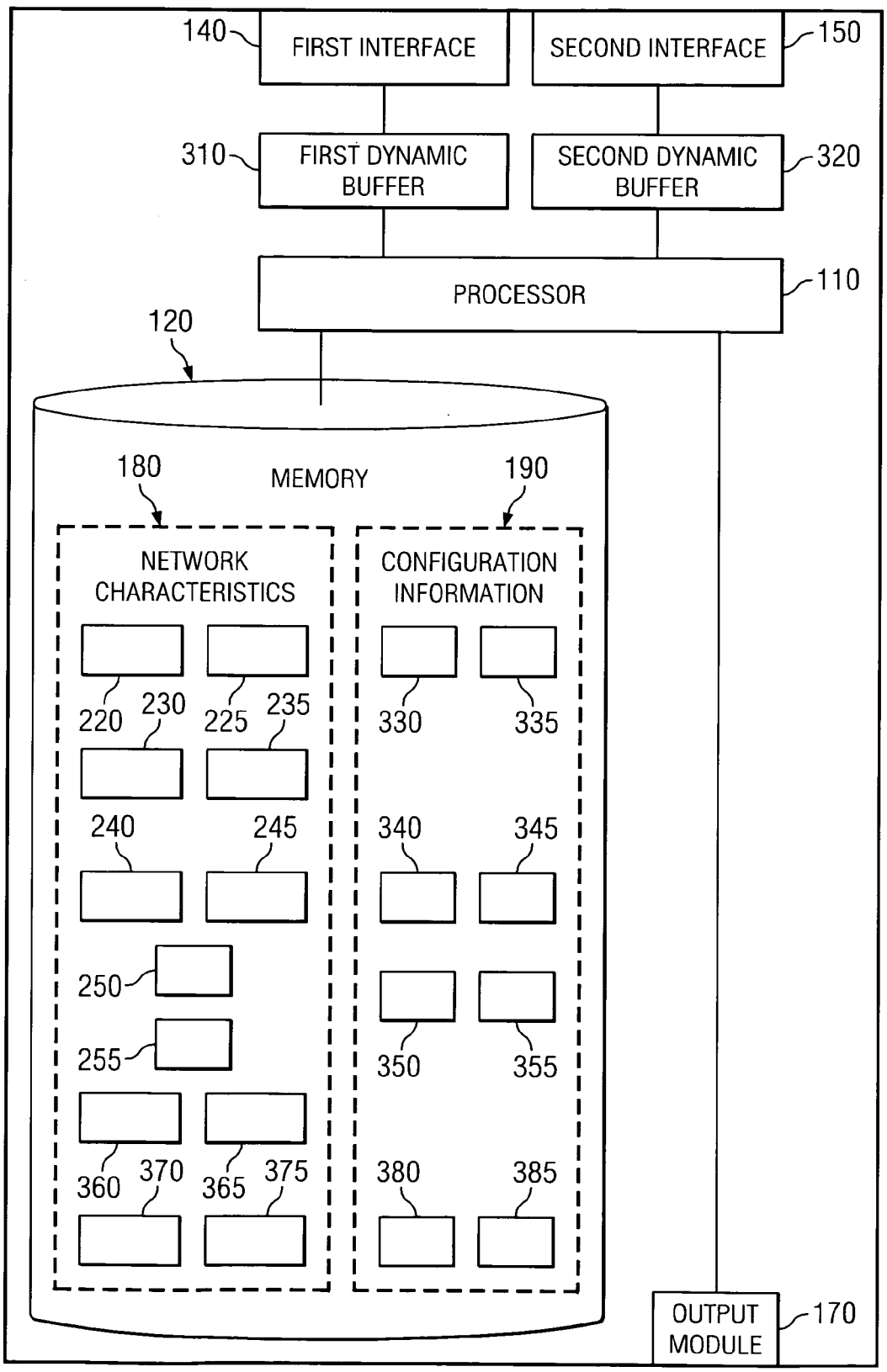
FIG. 3 is a block diagram illustrating contents of a mobile communication device according to an alternative embodiment.

FIG. 3 illustrates an embodiment of mobile station 20 that includes dynamic buffers, a first dynamic buffer 310 and a second dynamic buffer 320. In such an embodiment, mobile station 20 may be capable of adjusting playback delays associated with first dynamic buffer 310 and second dynamic buffer 320 to compensate for changes in first network 40, second network 50, and/or network characteristics 180. More specifically, mobile station 20 may configure and/or re-configure first dynamic buffer 310 by adjusting a first current playback delay 330, which may fluctuate between a first low playback delay 340 and a first high playback delay 350. Second dynamic buffer 320 may also be configured to have a variable playback delay, a second current playback delay 335, which may fluctuate between a second low playback delay 345 and a second high playback delay 355. However, if first dynamic buffer 310 and second dynamic buffer 320 store packets for too long before playing the packets, the user may experience excess delay or other forms of degradation in the communication session. Mobile station 20, in this embodiment, may be able to, under appropriate circumstances, re-configure first dynamic buffer 310 and second dynamic buffer 320 to provide lower playback delays, but with an increased probability of lost packets. Thus, mobile station 20 may be able to adjust playback delays associated with the dynamic buffers to achieve an acceptable combination of playback delay and packet loss.

Additionally, in the illustrated embodiment, network characteristics 180 of mobile station 20 include first minimum jitter 360, second minimum jitter 365, first nominal jitter 370, and second nominal jitter 375. First minimum jitter 360 and second minimum jitter 365 represent a low jitter value for first network 40 and second network 50, respectively. First minimum jitter 360 and second minimum jitter 365 may represent a lowest jitter experienced by the relevant network over a particular period of time, a typical lowest jitter experienced by networks of the same type as the relevant network, or any other suitable measure of an actual, typical, or expected minimum jitter level or any other suitable value based on actual, typical, or expected minimum jitter levels. As one example, first minimum jitter 360 and second minimum jitter 365 may represent a value that is a predetermined level above the lowest jitter of the network. As another example, first minimum jitter 360 and second minimum jitter 365 may be determined based on a value representing a particular percentile, such as the fifth percentile, of measured jitter values for networks similar to first network 40 and second network 50.

First nominal jitter 370 and second nominal jitter 375 may represent a nominal jitter experienced by first network 40 and second network 50, respectively. First nominal jitter 370 and second nominal jitter 375 may represent an average jitter experienced by the relevant network over a particular period of time, a typical jitter experienced by networks of the same type as the relevant network, or any other suitable measure of nominal, average, typical, or expected jitter level or any other suitable value based on nominal, average, typical, or expected jitter levels. As one example, first nominal jitter 360 and second nominal jitter 365 may be determined based on a value representing a predetermined percentile, such as the fiftieth percentile, of nominal jitter values for networks similar to first network 40 and second network 50.

Mobile station 20 may set a first target delay 380 and a second target delay 385 that represent a playback delay goal for first dynamic buffer 310 and second dynamic buffer 320 at switchover. In a particular embodiment, mobile station 20 determines first target delay 380 based on second nominal jitter 375 and second target delay 385 based on first nominal jitter 370. Assuming, as above, that first maximum delay 230 is less than second minimum delay 245, mobile station 20 may determine first target delay 380 and second target delay 385 based on the following formulas:

first target delay=second nominal jitter+maximum delay difference second target delay=first nominal jitter−minimum delay difference In a particular embodiment, first dynamic buffer 310 and second dynamic buffer 320 may be configured conservatively with greater playback delays to provide a lesser chance of packets arriving too late to be played. In such an embodiment, mobile station 20 may set first low playback delay 340 to ensure that first current playback delay 330 does not fall below first target delay 380 and second low playback delay 345 to ensure that second current playback delay 335 does not fall below second target delay 385. Thus, first low playback delay 340 and second low playback delay 345 may be set according to the following formulas:

first low delay value=MAX(first low jitter, first target delay)

second low delay value=MAX(second low jitter, second target delay)

By determining first low playback delay 340 based on first minimum jitter 360 and second low delay value based on second minimum jitter 365, mobile station 20 may ensure that first dynamic buffer 310 and second dynamic buffer 320 satisfy the jitter requirements of their respective network during normal operation. Additionally, by determining first low playback delay 340 and second low playback delay 345 based also on first target delay 380 and second target delay 385, respectively, mobile station 20 may be able to ensure that first current playback delay 330 will be greater than first target delay 380 and that second current playback delay 335 will be greater than second target delay 385 when a switchover between the networks occurs.

In another embodiment, first dynamic buffer 310 and second dynamic buffer 320 may be configured more aggressively with shorter playback delays to provide improved communication service, but with an increased chance of packets arriving too late to be played. In such an embodiment, mobile station 20 may configure first dynamic buffer 310 and second dynamic buffer 320, during normal operation, according to conventional jitter buffer management techniques. Thus, mobile station 20 may set first low playback delay 340 and second low playback delay 345 based on first minimum jitter 360 and second minimum jitter 365, respectively. More specifically, mobile station 20 may set first low playback delay 340 and second low playback delay 345 according to the following formulas:

first low delay value=first low jitter second low delay value=second low jitter

Depending on which network mobile station 20 is currently utilizing, mobile station 20 may attempt to adjust first current playback delay 330 or second current playback delay 335 to meet first target delay 380 or second target delay 385, respectively, when mobile station 20 detects a handoff trigger. For example, if mobile station 20 detects a handoff trigger while communicating on first network 40, mobile station 20 may attempt to adjust first current playback delay 330 to meet first target delay 380. Mobile station 20 may adjust first current playback delay 330 and/or second current playback delay 335 using conventional methods for managing dynamic jitter buffers or any other appropriate techniques. For example, mobile station 20 may adjust the playback delays by adding concealment or silent packets or by dropping packets associated with silence in the communication session.

Mobile station 20 may only have a limited amount of time to increase first current playback delay 330 or second current playback delay 335. In a particular embodiment, mobile station 20 may detect a handoff termination that indicates mobile station 20 should execute switchover between first network 40 and second network 50 and complete the handoff. The handoff termination may represent a determination that mobile station 20 can no longer detect one of the networks, a determination that a pre-determined amount of time has elapsed since the handoff trigger, or any other appropriate event causing mobile station 20 to complete the handoff. For example, after detecting the handoff trigger, mobile station 20 may move out of range of first network 40 and may be forced to switchover to second network 50.

Additionally, mobile station 20 may be limited as to how quickly mobile station 20 can adjust the current playback delays. Thus, mobile station 20 may increase the current playback delay of the relevant dynamic buffer until the current playback delay reaches the target delay for that buffer or until mobile station 20 detects the handoff termination. For example, if mobile station 20 is playing from first dynamic buffer 310 when mobile station 20 detects the handoff trigger, mobile station 20 may increase first current playback delay 330 until first current playback delay 330 reaches first target delay 380 or until mobile station 20 detects the handoff termination.

If mobile station 20 is unable to adjust the relevant current playback delay to the target delay for that dynamic buffer before executing the switchover, the appropriate packets may not be in the new buffer when the switchover occurs. As a result, mobile station 20 may be unable to ensure a seamless handoff in this embodiment. Thus, this embodiment of mobile station 20 may provide a more aggressive configuration for mobile station 20 that allows mobile station 20 to operate with smaller playback delays during normal operation but that also increases the possibility of lost packets or a non-seamless switchover at handoff.

Figure 4:
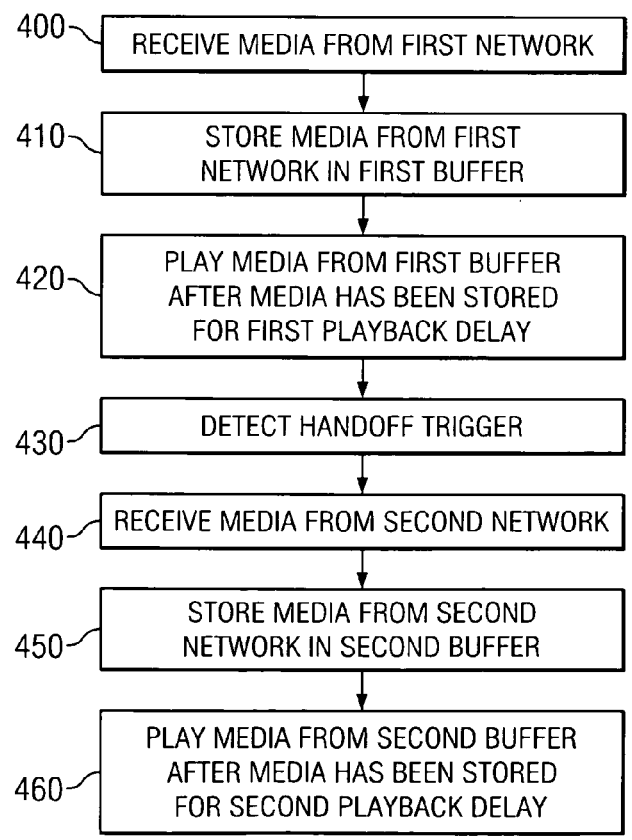
FIG. 4 is a flowchart illustrating steps for providing communication service utilizing a particular embodiment of the communication system.

FIG. 4 is a flowchart illustrating operation of a mobile station 20 in executing a handoff between first network 40 and second network 50, according to a particular embodiment. Mobile station 20 in this embodiment is assumed to include first buffer 130 and second buffer 140 that represent static jitter buffers. For the purposes of illustration, the described embodiment is assumed to be operating with first network 40 and second network 50 configured such that first maximum delay 230 is less than second minimum delay 245.

At step 400, mobile station 20 begins receiving media from first network 40. Mobile station 20 stores the media from first network 40 in first buffer 130, at step 410. At step 420, mobile station 20 begins playing media from first network 40 after the media from first network 40 has been stored in first buffer 130 an amount of time based on at least first playback delay 260. Mobile station 20, another device, or a user or other party may determine first playback delay 260 based on a delay value of the first network, a jitter value of the first network, a delay value of a second network, and a jitter value of the second network.

At step 430, mobile station 20 detects a handoff trigger. At step 440, mobile station 20 begins receiving media from second network 50. Mobile station 20 stores the media from second network 50 in second buffer 140, at step 450. At step 460, mobile station 20 begins playing media from second network 50 after the media from second network 50 has been stored in second buffer 140 an amount of time based on second playback delay 265. Mobile station 20, another device, or a user or other party may determine second playback delay 265 based on a delay value of the first network, a jitter value of the first network, a delay value of a second network, and a jitter value of the second network. Thus, using this or similar methods, particular embodiments of mobile station 20 can provide seamless handoffs between networks despite potential differences between the networks.

While the embodiments illustrated and the preceding description focus on a particular embodiment of mobile station 20 that includes specific elements, communication system 10 contemplates mobile station 20 having any suitable combination and arrangement of elements for facilitating communication and executing handoffs. Therefore, the components and functionalities described may be separate or combined as appropriate, and some or all of the functionalities of mobile station 20 may be performed by logic encoded in media, such as software and/or programmed logic devices. Moreover, communication system 10 contemplates mobile station 20 incorporating any suitable number and type of elements, such as processors, memory devices, network interfaces, and other elements suitable for providing the functionalities described in addition to any other suitable operations in any appropriate manner.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of providing communication service comprising:
   determining a first playback delay based on a maximum jitter of a first network, a maximum jitter of a second network, a maximum delay of the second network, and a minimum delay of the first network;
   storing media received from the first network in a first buffer;
   playing media received from the first network after the media received from the first network has been stored in the first buffer an amount of time based on the first playback delay;
   detecting a handoff trigger;
   storing media received from the second network in a second buffer, in response to detecting the handoff trigger; and
   playing media received from the second network.

2. The method of claim 1, wherein playing media received from the second network comprises:
   determining a second playback delay based on the maximum jitter of the second network, the maximum jitter of the first network, a minimum delay of the second network and a maximum delay of the first network; and
   playing media received from the second network after the media received from the second network has been stored in the second buffer an amount of time based on the second playback delay.

3. The method of claim 1, wherein determining the first playback delay comprises determining the first playback delay based on a greater of a maximum jitter of the first network and a sum of a maximum jitter of the second network and a maximum delay difference, wherein the maximum delay difference is equal to a difference between a maximum delay of the second network and a minimum delay of the first network.

4. The method of claim 3, wherein playing media received from the second network comprises:
    determining a second playback delay based on a greater of the maximum jitter of the second network and a difference between the maximum jitter of the first network and a minimum delay difference, wherein the minimum delay difference is equal to a difference between a minimum delay of the second network and a maximum delay of the first network; and
    playing media received from the second network after the media received from the second network has been stored in the second buffer an amount of time based on the second playback delay.

5. The method of claim 1, wherein determining the first playback delay comprises determining the first playback delay based on a greater of a maximum jitter of the first network and a difference between a maximum jitter of the second network and a minimum delay difference, wherein the minimum delay difference is equal to a difference between a minimum delay of the first network and a maximum delay of the second network.

6. A method of providing communication service comprising:
    determining a first minimum delay based on one or more network characteristics of a first network and one or more network characteristics of a second network;
    determining a first current delay for a first buffer, wherein the first current delay is greater than or equal to a first minimum delay;
    storing media received from the first network in the first buffer;
    playing media received from the first network after the media received from the first network has been stored in the first buffer an amount of time based on at least the first current delay;
    detecting a handoff trigger; and
    storing media received from the second network in a second buffer, in response to the handoff trigger, in response to detecting the handoff trigger; and
    playing media received from the second network.

7. The method of claim 6, wherein playing media received from the first network comprises:
    playing media received from the first network after the media received from the first network has been stored in the first buffer an amount of time based on at least the first current delay;
    adjusting the first current delay based on one or more network characteristics of the first network, wherein the adjusted first current delay is greater than or equal to the first minimum delay; and
    playing media received from the first network after the media received from the first network has been stored in the first buffer an amount of time based on at least the adjusted first current delay.

8. The method of claim 6, wherein determining the first playback delay comprises determining the first minimum delay based on a low jitter value of the first network, a nominal jitter value of the second network, a maximum delay of the second network, and a minimum delay of the first network.

9. The method of claim 8, wherein playing media received from the second network comprises:
    determining a second minimum delay based on a low jitter value of the second network, a nominal jitter value of the first network, a minimum delay of the second network, and a maximum delay of the first network;
    determining a second current delay for a second buffer, wherein the second current delay is greater than or equal to the second minimum delay; and
    playing media received from the second network after the media received from the second network has been stored in the second buffer an amount of time based on the second current delay.

10. The method of claim 6, wherein determining the first playback delay comprises determining the first minimum delay based on a greater of a low jitter value of the first network and a sum of a nominal jitter value of the second network and a maximum delay difference, wherein the maximum delay difference is equal to a difference between a maximum delay of the second network and a minimum delay of the first network.

11. The method of claim 8, wherein playing media received from the second network comprises:
    determining a second minimum delay based on a greater of a low jitter value of the second network and a difference between a nominal jitter value of the first network and a minimum delay difference, wherein the minimum delay difference is equal to a difference between a minimum delay of the second network and a maximum delay of the first network;
    determining a second current delay for a second buffer, wherein the second current delay is greater than or equal to the second minimum delay; and
    playing media received from the second network after the media received from the second network has been stored in the second buffer an amount of time based on the second current delay.

12. The method of claim 6, wherein determining the first playback delay comprises determining the first minimum delay based on a greater of a low jitter value of the first network and a difference between a nominal jitter value of the second network and a minimum delay difference, wherein the minimum delay difference is equal to a difference between a minimum delay of the first network and a maximum delay of the second network.

13. A method of providing communication service comprising:
    determining a first target delay based on one or more network characteristics of a first network and one or more network characteristics of a second network;
    determining a first current delay for a first buffer, wherein the first current delay is greater than or equal to a low jitter value of the first network;
    storing media received from the first network in the first buffer;
    playing media received from the first network after the media received from the first network has been stored in the first buffer an amount of time based on at least the first current delay;
    detecting a handoff trigger;
    storing media received from the second network in a second buffer, in response to detecting the handoff trigger;
    increasing the first current delay, if the first current delay is less than the first target delay;
    playing media received from the first network after the media received from the first network has been stored in the first buffer an amount of time based on at least the increased first current delay;
    detecting a handoff termination; and playing media received from the second network, in response to detecting the handoff termination.

14. The method of claim 13, wherein determining the first playback delay comprises determining the first target delay based on a low jitter value of the first network, a nominal jitter value of the second network, a maximum delay of the second network, and a minimum delay of the first network.

15. The method of claim 13, wherein determining the first playback delay comprises determining the first target delay based on a greater of a low jitter value of the first network and a sum of a nominal jitter value of the second network and a maximum delay difference, wherein the maximum delay difference is equal to a difference between a maximum delay of the second network and a minimum delay of the first network.

16. The method of claim 13, further comprising determining the first target delay based on a greater of the low jitter value of the first network and a difference between a nominal jitter value of the second network and a minimum delay difference, wherein the minimum delay difference is equal to a difference between a minimum delay of the first network and a maximum delay of the second network.

17. The method of claim 13, wherein playing media from the second network comprises:
 determining a second current delay for the second buffer, wherein the second current delay is greater than or equal to a low jitter value of the second network;
 playing media received from the second network, in response to detecting the handoff termination, after the media received from the second network has been stored in the second buffer an amount of time based on the second current delay;
 detecting a second handoff trigger;
 increasing the second current delay, if the second current delay is less than a second target delay, the second target delay based on a greater of the low jitter value of the second network and a difference between a nominal jitter value of the first network and a minimum delay difference, wherein the minimum delay difference is equal to a difference between a minimum delay of the second network and a maximum delay of the first network;
 playing media received from the second network after the media received from the second network has been stored in the second buffer an amount of time based on at least the increased second current delay;
 detecting a second handoff termination; and
 playing media received from the first network, in response to detecting the second handoff termination.

18. A device for providing communication service comprising:
 a first interface operable to receive media from a first network;
 a second interface operable to receive media from a second network;
 a first buffer operable to store media received from the first network;
 a second buffer operable to store media received from the second network;
 an output module operable to play media; and
 a processor operable to:
  determine a first playback delay based on a maximum jitter of the first network, a maximum jitter of the second network, a maximum delay of the second network, and a minimum delay of the first network;
  store media received from the first network in the first buffer;
  play media received from the first network, using the output module, after the media received from the first network has been stored in the first buffer an amount of time based on at least the first playback delay;
  detect a handoff trigger;
  store media received from the second network in the second buffer, in response to detecting the handoff trigger; and
  play media received from the second network.

19. The device of claim 18, wherein the processor is further operable to play media received from the second network by:
 determining a second playback delay based on the maximum jitter of the second network, the maximum jitter of the first network, a minimum delay of the second network, and a maximum delay of the first network;
 play media received from the second network after the media received from the second network has been stored in the second buffer an amount of time based on a second playback delay.

20. The device of claim 18, wherein the processor is further operable to determine the first playback delay based on a greater of a maximum jitter of the first network and a sum of a maximum jitter of the second network and a maximum delay difference, wherein the maximum delay difference is equal to a difference between a maximum delay of the second network and a minimum delay of the first network.

21. The device of claim 20, wherein the processor is further operable to play media received from the second network by:
 determining a second playback delay based on a greater of the maximum jitter of the second network and a difference between the maximum jitter of the first network and a minimum delay difference, wherein the minimum delay difference is equal to a difference between a minimum delay of the second network and a maximum delay of the first network;
 play media received from the second network after the media received from the second network has been stored in the second buffer an amount of time based on a second playback delay.

22. The device of claim 18, wherein the processor is further operable to determine the first playback delay based on a greater of a maximum jitter of the first network and a difference between a maximum jitter of the second network and a minimum delay difference, wherein the minimum delay difference is equal to a difference between a minimum delay of the first network and a maximum delay of the second network.

23. A device for providing communication service comprising:
 a first interface, operable to receive media from a first network;
 a second interface, operable to receive media from a second network;
 a first buffer, operable to store media received from the first network;
 a second buffer, operable to store media received from the second network;
 an output module, operable to play media; and
 a processor operable to:
  determine a first minimum delay based on one or more network characteristics of the first network and one or more network characteristics of the second network;
  determine a first current delay for the first buffer, wherein the first current delay is greater than or equal to the first minimum delay;
  store media received from the first network in the first buffer;

play media received from the first network, using the output module, after the media received from the first network has been stored in the first buffer an amount of time based on at least the first current delay;

detect a handoff trigger;

store media received from the second network in the second buffer, in response to the handoff trigger; and play media received from the second network.

24. The device of claim 23, wherein the processor is further operable to play media received from the first network by:

playing media received from the first network after the media received from the first network has been stored in the first buffer an amount of time based on at least the first current delay;

adjusting the first current delay based on one or more network characteristics of the first network, wherein the adjusted first current delay is greater than or equal to the first minimum delay; and playing media received from the first network after the media received from the first network has been stored in the first buffer an amount of time based on at least the adjusted first current delay.

25. The device of claim 23, wherein the processor is further operable to determine the first minimum delay by determining the first minimum delay based on a low jitter value of the first network, a nominal jitter value of the second network, a maximum delay of the second network, and a minimum delay of the first network.

26. The device of claim 25, wherein the processor is further operable to play media received from the second network by:

determining a second minimum delay based on a low jitter value of the second network, a nominal jitter value of the first network, a minimum delay of the second network, and a maximum delay of the first network;

determining a second current delay for the second buffer, wherein the second current delay is greater than or equal to the second minimum delay; and play media received from the second network after the media received from the second network has been stored in the second buffer an amount of time based on the second current delay.

27. The device of claim 23, wherein the processor is further operable to determine the first minimum delay by determining the first minimum delay based on a greater of a low jitter value of the first network and a sum of a nominal jitter value of the second network and a maximum delay difference, wherein the maximum delay difference is equal to a difference between a maximum delay of the second network and a minimum delay of the first network.

28. The device of claim 27, wherein the processor is further operable to play media received from the second network by:

determining a second minimum delay based on a greater of a low jitter value of the second network and a difference between a nominal jitter value of the first network and a minimum delay difference, wherein the minimum delay difference is equal to a difference between a minimum delay of the second network and a maximum delay of the first network;

determining a second current delay for the second buffer, wherein the second current delay is greater than or equal to the second minimum delay; and play media received from the second network after the media received from the second network has been stored in the second buffer an amount of time based on the second current delay.

29. The device of claim 23, wherein the processor is further operable to determine the first minimum delay by determining the first minimum delay based on a greater of a low jitter value of the first network and a difference between a nominal jitter value of the second network and a minimum delay difference, wherein the minimum delay difference is equal to a difference between a minimum delay of the first network and a maximum delay of the second network.

30. A device for providing communication service comprising:

a first interface, operable to receive media from a first network;

a second interface, operable to receive media from a second network;

a first buffer, operable to store media received from the first network;

a second buffer, operable to store media received from the second network;

an output module, operable to play media; and a processor, operable to:

determine a first target delay based on one or more network characteristics of the first network and one or more network characteristics of the second network;

determine a first current delay for the first buffer, wherein the first current delay is greater than or equal to a low jitter value of the first network;

store media received from the first network in the first buffer;

play media received from the first network after the media received from the first network has been stored in the first buffer an amount of time based on at least the first current delay;

detect a handoff trigger;

store media received from the second network in the second buffer, in response to the handoff trigger;

increase the first current delay, if the first current delay is less than a first target delay, play media received from the first network after the media received from the first network has been stored in the first buffer an amount of time based on at least the increased first current delay;

detect a handoff termination; and play media received from the second network, in response to detecting the handoff termination, after the media received from the second network has been stored in the second buffer an amount of time based on the second current delay.

31. The device of claim 30, wherein the processor is further operable to determine the first target delay based on the low jitter value of the first network, a nominal jitter value of the second network, a maximum delay of the second network, and a minimum delay of the first network.

32. The device of claim 30, wherein the processor is further operable to determine the first target delay based on a greater of the low jitter value of the first network and a sum of a nominal jitter value of the second network and a maximum delay difference, wherein the maximum delay difference is equal to a difference between a maximum delay of the second network and a minimum delay of the first network.

33. The device of claim 30, wherein the processor is further operable to determine the first target delay based on a greater of the low jitter value of the first network and a difference between a nominal jitter value of the second network and a minimum delay difference, wherein the minimum delay difference is equal to a difference between a minimum delay of the first network and a maximum delay of the second network.

34. The device of claim 30, wherein the processor is further operable to:

determine a second current delay for the second buffer, wherein the second current delay is greater than or equal to a low jitter value of the second network;

play media received from the second network, in response to detecting the handoff termination, after the media received from the second network has been stored in the second buffer an amount of time based on the second current delay;

detect a second handoff trigger;

increase the second current delay, if the second current delay is less than a second target delay, the second target delay based on a greater of the low jitter value of the second network and a difference between a nominal jitter value of the first network and a minimum delay difference, wherein the minimum delay difference is equal to a difference between a minimum delay of the second network and a maximum delay of the first network;

play media received from the second network after the media received from the second network has been stored in the second buffer an amount of time based on at least the increased second current delay;

detect a second handoff termination; and play media received from the first network, in response to detecting the second handoff termination.

35. Logic for providing telecommunication service, the logic encoded in media and operable when executed to perform the steps of:

determining a first playback delay based on a maximum jitter of a first network, a maximum jitter of a second network, a maximum delay of the second network, and a minimum delay of the first network;

storing media received from the first network in a first buffer;

playing media received from the first network after the media received from the first network has been stored in the first buffer an amount of time based on at least the first playback delay;

detecting a handoff trigger;

storing media received from the second network in a second buffer, in response to detecting the handoff trigger; and playing media received from the second network.

36. The logic of claim 35, wherein the logic is further operable to play media received from the second network by:

determining a second playback delay based on the maximum jitter of the second network, the maximum jitter of the first network, a minimum delay of the second network, and a maximum delay of the first network; and playing media received from the second network after the media received from the second network has been stored in the second buffer an amount of time based on a second playback delay.

37. The logic of claim 35, wherein the logic is further operable to determine the first playback delay based on a greater of a maximum jitter of the first network and a sum of a maximum jitter of the second network and a maximum delay difference, wherein the maximum delay difference is equal to a difference between a maximum delay of the second network and a minimum delay of the first network.

38. The logic of claim 37, wherein the logic is further operable to play media received from the second network by:

determining a second playback delay based on a greater of the maximum jitter of the second network and a difference between the maximum jitter of the first network and a minimum delay difference, wherein the minimum delay difference is equal to a difference between a minimum delay of the second network and a maximum delay of the first network; and playing media received from the second network after the media received from the second network has been stored in the second buffer an amount of time based on a second playback delay.

39. The logic of claim 35, wherein the logic is further operable to determine the first playback delay based on a greater of a maximum jitter of the first network and a difference between the maximum jitter of the second network and a minimum delay difference, wherein the minimum delay difference is equal to a difference between a minimum delay of the first network and a maximum delay of the second network.

40. Logic for providing telecommunication service, the logic encoded in media and operable when executed to perform the steps of:

determining a first minimum delay based on one or more network characteristics of a first network and one or more network characteristics of a second network;

determining a first current delay for a first buffer, the first current delay greater than or equal to the first minimum delay;

storing media received from the first network in the first buffer;

playing media received from the first network after the media received from the first network has been stored in the first buffer an amount of time based on at least the first current delay;

detecting a handoff trigger;

storing media received from the second network in a second buffer, in response to detecting the handoff trigger; and playing media received from the second network.

41. The logic of claim 40, wherein the logic is further operable to play media received from the first network by:

playing media received from the first network after the media received from the first network has been stored in the first buffer an amount of time based on at least the first current delay;

adjusting the first current delay based on one or more network characteristics of the first network, wherein the adjusted first current delay is greater than or equal to the first minimum delay; and playing media received from the first network after the media received from the first network has been stored in the first buffer an amount of time based on at least the adjusted first current delay.

42. The logic of claim 40, wherein the logic is further operable to determine the first minimum delay by determining the first minimum delay based on a low jitter value of the first network, a nominal jitter value of the second network, a maximum delay of the second network, and a minimum delay of the first network.

43. The logic of claim 42, wherein the logic is further operable to play media received from the second network by:

determining a second minimum delay based on a low jitter value of the second network, a nominal jitter value of the first network, a minimum delay of the second network, and a maximum delay of the first network;

determining a second current delay for the second buffer, wherein the second current delay is greater than or equal to the second minimum delay; and playing media received from the second network after the media received from the second network has been stored in the second buffer an amount of time based on the second current delay.

44. The logic of claim 40, wherein the logic is further operable to determine the first minimum delay by determining the first minimum delay based on a greater of the low jitter value of the first network and a sum of a nominal jitter value of the second network and a maximum delay difference, wherein the maximum delay difference is equal to a difference between a maximum delay of the second network and a minimum delay of the first network.

45. The logic of claim 44, wherein the logic is further operable to play media received from the second network by:
   determining a second minimum delay based on a greater of a low jitter value of the second network and a difference between a nominal jitter value of the first network and a minimum delay difference, wherein the minimum delay difference is equal to a difference between a minimum delay of the second network and a maximum delay of the first network;
   determining a second current delay for the second buffer, wherein the second current delay is greater than or equal to the second minimum delay; and
   playing media received from the second network after the media received from the second network has been stored in the second buffer an amount of time based on the second current delay.

46. The logic of claim 40, wherein the logic is further operable to determine the first minimum delay by determining the first minimum delay based on a greater of a low jitter value of the first network and a difference between a nominal jitter value of the second network and a minimum delay difference, wherein the minimum delay difference is equal to a difference between a minimum delay of the first network and a maximum delay of the second network.

47. Logic for providing telecommunication service, the logic encoded in media and operable when executed to perform the steps of:
   determining a first target delay based on one or more network characteristics of a first network and one or more network characteristics of a second network;
   determining a first current delay for a first buffer, wherein the first current delay is greater than or equal to a low jitter value of the first network;
   storing media received from the first network in the first buffer;
   playing media received from the first network after the media received from the first network has been stored in the first buffer an amount of time based on at least the first current delay;
   detecting a handoff trigger;
   storing media received from the second network in a second buffer, in response to detecting the handoff trigger;
   increasing the first current delay, if the first current delay is less than the first target delay;
   playing media received from the first network after the media received from the first network has been stored in the first buffer an amount of time based on at least the increased first current delay;
   detecting a handoff termination; and
   playing media received from the second network, in response to detecting the handoff termination.

48. The logic of claim 47, wherein the logic is further operable to determine the first target delay based on the low jitter value of the first network, a nominal jitter value of the second network, a maximum delay of the second network, and a minimum delay of the first network.

49. The logic of claim 47, wherein the logic is further operable to determine the first target delay based on a greater of the low jitter value of the first network and a sum of a nominal jitter value of the second network and a maximum delay difference, wherein the maximum delay difference is equal to a difference between a maximum delay of the second network and a minimum delay of the first network.

50. The logic of claim 47, wherein the logic is further operable to determine the first target delay based on a greater of the low jitter value of the first network and a difference between a nominal jitter value of the second network and a minimum delay difference, wherein the minimum delay difference is equal to a difference between a minimum delay of the first network and a maximum delay of the second network.

51. The logic of claim 47, wherein the logic is further operable to play media received from the second network by:
   determining a second current delay for the second buffer, wherein the second current delay is greater than or equal to a low jitter value of the second network;
   playing media received from the second network, in response to detecting the handoff termination, after the media received from the second network has been stored in the second buffer an amount of time based on the second current delay;
   detecting a second handoff trigger;
   increasing the second current delay, if the second current delay is less than a second target delay, the second target delay based on a greater of the low jitter value of the second network and a difference between a nominal jitter value of the first network and a minimum delay difference, wherein the minimum delay difference is equal to a difference between a minimum delay of the second network and a maximum delay of the first network;
   playing media received from the second network after the media received from the second network has been stored in the second buffer an amount of time based on at least the increased second current delay;
   detecting a second handoff termination; and
   playing media received from the first network, in response to detecting the second handoff termination.

52. A system for providing communication service comprising:
   a first network, operable to transmit media to a mobile station;
   a second network, operable to transmit media to a mobile station; and
   a communication device, operable to:
      determine a first playback delay based on a maximum jitter of the first network, a maximum jitter of the second network, a maximum delay of the second network, and a minimum delay of the first network;
      store media received from the first network in a first buffer;
      play media received from the first network after the media received from the first network has been stored in the first buffer an amount of time based on at least the first playback delay;
      detecting a handoff trigger;
      storing media received from the second network in a second buffer, in response to detecting the handoff trigger; and
      playing media received from the second network.

53. The system of claim 52, wherein the communication device is further operable to play media received from the second network by:
  determining a second playback delay based on the maximum jitter of the second network, the maximum jitter of the first network, a minimum delay of the second network, and a maximum delay of the first network; and
  playing media received from the second network after the media received from the second network has been stored in the second buffer an amount of time based on a second playback delay.

54. The system of claim 52, wherein the communication device is further operable to determine the first playback delay based on a greater of the maximum jitter of the first network and a sum of the maximum jitter of the second network and a maximum delay difference, wherein the maximum delay difference is equal to a difference between a maximum delay of the second network and a minimum delay of the first network.

55. The system of claim 54, wherein the communication device is further operable to play media received from the second network by:
  determining a second playback delay based on a greater of the maximum jitter of the second network and a difference between the maximum jitter of the first network and a minimum delay difference, wherein the minimum delay difference is equal to a difference between a minimum delay of the second network and a maximum delay of the first network; and
  playing media received from the second network after the media received from the second network has been stored in the second buffer an amount of time based on a second playback delay.

56. The system of claim 52, wherein the communication device is further operable to determine the first playback delay based on a greater of a maximum jitter of the first network and a difference between the maximum jitter of the second network and a minimum delay difference, wherein the minimum delay difference is equal to a difference between a minimum delay of the first network and a maximum delay of the second network.

57. A system for providing communication service comprising:
  a first network, operable to transmit media to a mobile station;
  a second network, operable to transmit media to a mobile station; and
  a communication device, operable to:
    determine a first minimum delay based on one or more network characteristics of the first network and one or more network characteristics of the second network;
    determine a first current delay for a first buffer, the first current delay greater than or equal to the first minimum delay;
    store media received from the first network in the first buffer;
    play media received from the first network after the media received from the first network has been stored in the first buffer an amount of time based on at least the first current delay;
    detect a handoff trigger;
    store media received from the second network in the second buffer, in response to detecting the handoff trigger; and
    play media received from the second network.

58. The system of claim 57, wherein the communication device is further operable to play media received from the first network by:
  playing media received from the first network after the media received from the first network has been stored in the first buffer an amount of time based on at least the first current delay;
  adjusting the first current delay based on one or more network characteristics of the first network, wherein the adjusted first current delay is greater than or equal to the first minimum delay; and
  playing media received from the first network after the media received from the first network has been stored in the first buffer an amount of time based on at least the adjusted first current delay.

59. The system of claim 57, wherein the communication device is further operable to determine the first minimum delay by determining the first minimum delay based on a low jitter value of the first network, a nominal jitter value of the second network, a maximum delay of the second network, and a minimum delay of the first network.

60. The system of claim 59, wherein the communication device is further operable to play media received from the second network by:
  determining a second minimum delay based on a low jitter value of the second network, a nominal jitter value of the first network, a minimum delay of the second network, and a maximum delay of the first network;
  determining a second current delay for a second buffer, wherein the second current delay is greater than or equal to the second minimum delay; and
  playing media received from the second network after the media received from the second network has been stored in the second buffer an amount of time based on the second current delay.

61. The system of claim 57, wherein the communication device is further operable to determine the first minimum delay by determining the first minimum delay based on a greater of the low jitter value of the first network and a sum of a nominal jitter value of the second network and a maximum delay difference, wherein the maximum delay difference is equal to a difference between a maximum delay of the second network and a minimum delay of the first network.

62. The system of claim 61, wherein the communication device is further operable to play media received from the second network by:
  determining a second minimum delay based on a greater of a low jitter value of the second network and a difference between a nominal jitter value of the first network and a minimum delay difference, wherein the minimum delay difference is equal to a difference between a minimum delay of the second network and a maximum delay of the first network;
  determining a second current delay for a second buffer, wherein the second current delay is greater than or equal to the second minimum delay; and
  playing media received from the second network after the media received from the second network has been stored in the second buffer an amount of time based on the second current delay.

63. The system of claim 57, wherein the communication device is further operable to determine the first minimum delay by determining the first minimum delay based on a greater of a low jitter value of the first network and a difference between a nominal jitter value of the second network and a minimum delay difference, wherein the minimum delay difference is equal to a difference between a minimum delay of the first network and a maximum delay of the second network.

64. A system for providing communication service comprising:
- a first network, operable to transmit media to a mobile station;
- a second network, operable to transmit media to a mobile station; and
- a communication device, operable to:
  - determine a first target delay based on one or more network characteristics of the first network and one or more network characteristics of the second network;
  - determine a first current delay for a first buffer, wherein the first current delay is greater than or equal to a low jitter value of the first network;
  - store media received from the first network in the first buffer;
  - play media received from the first network after the media received from the first network has been stored in the first buffer an amount of time based on at least the first current delay;
  - detect a handoff trigger;
  - store media received from the second network in the second buffer, in response to detecting the handoff trigger;
  - increase the first current delay, if the first current delay is less than a first target delay;
  - play media received from the first network after the media received from the first network has been stored in the first buffer an amount of time based on at least the increased first current delay;
  - detect a handoff termination; and
  - play media received from the second network, in response to detecting the handoff termination.

65. The system of claim 64, wherein the communication device is further operable to determine the first target delay based on the low jitter value of the first network, a nominal jitter value of the second network, a maximum delay of the second network, and a minimum delay of the first network.

66. The system of claim 64, wherein the communication device is further operable to determine the first target delay based on a greater of the low jitter value of the first network and a sum of a nominal jitter value of the second network and a maximum delay difference, wherein the maximum delay difference is equal to a difference between a maximum delay of the second network and a minimum delay of the first network.

67. The system of claim 64, wherein the communication device is further operable to determine the first target delay based on a greater of the low jitter value of the first network and a difference between a nominal jitter value of the second network and a minimum delay difference, wherein the minimum delay difference is equal to a difference between a minimum delay of the first network and a maximum delay of the second network.

68. The system of claim 64, wherein the communication device is further operable to play media received from the second network by:
- determining a second current delay for the second buffer, wherein the second current delay is greater than or equal to a low jitter value of the second network;
- playing media received from the second network, in response to detecting the handoff termination, after the media received from the second network has been stored in the second buffer an amount of time based on the second current delay;
- detecting a second handoff trigger;
- increasing the second current delay, if the second current delay is less than a second target delay, the second target delay based on a greater of the low jitter value of the second network and a difference between a nominal jitter value of the first network and a minimum delay difference, wherein the minimum delay difference is equal to a difference between a minimum delay of the second network and a maximum delay of the first network;
- playing media received from the second network after the media received from the second network has been stored in the second buffer an amount of time based on at least the increased second current delay;
- detecting a second handoff termination; and
- playing media received from the first network, in response to detecting the second handoff termination.

69. A system for providing communication service comprising:
- means for determining a first playback delay based on a maximum jitter of a first network, a maximum jitter of a second network, a maximum delay of the second network, and a minimum delay of the first network;
- means for storing media received from the first network in a first buffer;
- means for playing media received from the first network after the media received from the first network has been stored in the first buffer an amount of time based on the first playback delay;
- means for detecting a handoff trigger;
- means for storing media received from the second network in a second buffer in response to detecting the handoff trigger; and
- means for playing media received from the second network.

70. A system for providing communication service comprising:
- means for determining a first minimum delay based on one or more network characteristics of a first network and one or more network characteristics of a second network;
- means for determining a first current delay for a first buffer, wherein the first current delay is greater than or equal to a first minimum delay;
- means for storing media received from the first network in the first buffer;
- means for playing media received from the first network after the media received from the first network has been stored in the first buffer an amount of time based on at least the first current delay;
- means for detecting a handoff trigger;
- means for storing media received from the second network in a second buffer, in response to detecting the handoff trigger;
- means for playing media received from the second network.

71. A method of providing communication service comprising:
- means for determining a first target delay based on one or more network characteristics of a first network and one or more network characteristics of a second network;
- means for determining a first current delay for a first buffer, wherein the first current delay is greater than or equal to a low jitter value of the first network;
- means for storing media received from the first network in the first buffer;

means for playing media received from the first network after the media received from the first network has been stored in the first buffer an amount of time based on at least the first current delay;

means for storing media received from the second network in a second buffer;

means for detecting a handoff trigger;

means for increasing the first current delay, if the first current delay is less than the first target delay;

means for playing media received from the first network after the media received from the first network has been stored in the first buffer an amount of time based on at least the increased first current delay;

means for detecting a handoff termination; and means for playing media received from the second network, in response to detecting the handoff termination.

* * * * *